United States Patent Office 3,518,316
Patented June 30, 1970

3,518,316
BROMINATION PROCESS
Charles Carmen Cumbo, Wilmington, Del., assignor to
E. I. du Pont de Nemours and Company, Wilmington,
Del., a corporation of Delaware
No Drawing. Filed July 8, 1968, Ser. No. 743,030
Int. Cl. C07c 25/00, 43/20
U.S. Cl. 260—612                                 5 Claims

ABSTRACT OF THE DISCLOSURE

High purity 4,4'-dibromobiphenyl and 4,4'-dibromodiphenyl ether are obtained by reacting one mole of biphenyl or diphenyl ether with approximately 2.0 moles of bromine in the presence of liquid sulfur dioxide at temperatures within the range of −40° C. to −5° C.

BACKGROUND OF THE INVENTION

Methods for the direct bromination of biphenyl and diphenyl ether are shown in the prior art. One such method utilizes aqueous acetic acid as the reaction solvent. Unfortunately, this reaction method as well as the other known methods of bromination are relatively non-selective, yielding isometric mixtures of brominated materials.

The process of the present invention offers a simple and economical method for preparing the essentially pure 4,4'-dibromo derivatives in high yields.

SUMMARY OF THE INVENTION

This invention is directed to a process for preparing 4,4'-dibromobiphenyl and 4,4'-dibromodiphenyl ether. The process comprises reacting one mole of biphenyl or diphenyl ether with about 2 moles of bromine in the presence of liquid sulfur dioxide at temperatures within the range of from −40° C. to −5° C., and maintaining the resulting reaction mixture within said range until the production of 4,4'-dibromobiphenyl or 4,4'-dibromodiphenyl ether ceases and then isolating solid 4,4'-dibromobiphenyl or 4,4'-dibromodiphenyl ether from the reaction mixture by physical means. Preferably, the solid product obtained is washed with liquid sulfur dioxide to remove any traces of excess bromine and monobrominated material.

DETAILED DESCRIPTION OF THE INVENTION

It has been found that by the process of this invention 4,4'-dibromobiphenyl and 4,4'-dibromodiphenyl ether can be obtained in yields greater than 95%. In addition, it is most beneficial and unexpected that the product has a high degree of isomeric purity and contains a minimum amount of unreacted starting materials and reaction intermediates.

The starting materials used in the process of this invention should be of high quality and free of water. The presence of water will result in the reduction of bromine to hydrogen bromide along with the oxidation of sulfur dioxide to sulfuric acid thus decreasing the yield and purity of the desired product.

The process of this invention is most conveniently carried out by first dissolving biphenyl or diphenyl ether in liquid sulfur dioxide and then adding bromine to the resulting solution. The bromine may be added dissolved in liquid sulfur dioxide if desire or it may be added neat, i.e., without diluent.

The temperature at which the biphenyl or diphenyl ether solution is maintained during the addition of bromine is very important in obtaining high yields and a product that is essentially isomerically pure. The temperature of the solution should be within the range of from −40° C. to −5° C. and preferably within the range of from −30° C. to −10° C.

The amount of bromine added to the biphenyl or diphenyl ether-sulfur dioxide solution is preferably 2.1 moles per mole of biphenyl or diphenyl ether. Substantial amounts of bromine in excess of the stoichiometric amount results in an increase in the reaction rate and produces product which is essentially free of starting material and reaction intermediates. If less than two moles of bromine per mole of biphenyl or diphenyl ether are used, no appreciable loss in over-all yields of product results if the product is washed with liquid sulfur dioxide and the sulfur dioxide containing the 4-bromobiphenyl or 4-bromodiphenyl ether intermediate is recyled and used to dissolve more starting materials.

During the admixing of the bromine and biphenyl or diphenyl ether, the refluxing of the liberated hydrobromic acid will cause the temperature to drop well below −5° C., the approximate boiling point of the reaction solution. If the upper limit of the specified temperature range is preferred, the apparatus must be designed to allow for the removal of gaseous hydrobromic acid as it is being formed. If the reaction temperature is maintained above −10° C. for the majority of the reaction time a greater contamination of the product with isomeric by-products such as the 2,4'-dibromobiphenyl or the 2,4'-dibromodiphenyl ether will result.

Reaction time is not critical for the process. Generally, diphenyl ether brominates at a faster rate than biphenyl in accordance with the process of this invention. For batchwise operation, the reaction time is usually in the range of from 2 to 10 hours. However, it will be understood that in a continuous reaction system shorter reaction times can be utilized if the unreacted materials are recycled after separation. It will also be understood that in batch operation the reaction can be stopped short of completion with a sacrifice in the yield of 4,4'-dibromobiphenyl or 4,4'-dibromodiphenyl ether product. This is particularly practical since the intermediate products can be separated readily from the desired end products.

The solid 4,4'-dibromobiphenyl or 4,4'-dibromodiphenyl ether is most conveniently isolated from the reaction mixture by filtration. The reaction mixture should be cooled below −10° C. during the filtration so that the sulfur dioxide doses not evaporate. When applying the technique to the isolation of 4,4'-dibromodiphenyl ether, the amount of liquid sulfur dioxide used in the reaction should be minimized, due to the high solubility of ether in this medium. Other equivalent physical means of isolation will be apparent.

To assure that the product is not contaminated with bromine or monobrominated derivatives, the product obtained by filtration can be washed with liquid sulfur dioxide, which can then be recycled and used to dissolve one of the reactants. This washing step not only assures an extremely pure product but also increases the yield obtained from the over-all reaction because any 4-bromobiphenyl or 4-bromodiphenyl ether in the recirculated sulfur dioxide is ultimately converted to 4,4'-dibromobiphenyl or 4,4'-dibromodiphenyl ether. Any sulfur dioxide wetting the filtered product should be of course be allowed to evaporate before use or storage.

The process of this invention is suitable for operation either batchwise or in a continuous manner. The process of the invention is illustrated by the following examples wherein all percentages, unless otherwise specified, are percentages by weight.

EXAMPLE 1

Into a 500 ml. flask equipped with a motor driven stirrer, dropping funnel, Dry-Ice acetone reflux condenser, low temperature thermometer and drying tube are placed 46.2 g. of pure biphenyl and 429 g. (300 cc.) of anhydrous, liquid sulfur dioxide. The temperature of the liquid sulfur dioxidediphenyl solution is −6° C. 115 g. of bromine are added over a period of 65 minutes. During the addition of bromine the mixture is vigorously agitated by means of the stirrer. As the reaction proceeds, the liberated hydrobromic acid causes the temperature to decrease rapidly. After the bromine is added the mixture is maintained at −22° C. for 6.0 hours. This low temperature is achieved without external cooling baths by simply allowing the liberated hydrobromic acid to boil under reflux. At the end of this six-hour period the Dry-Ice acetone reflux condenser is replaced with a water cooled condenser to allow for the removal of the hydrobromic acid. As the hydrobromic acid distills from the mixture the temperature gradually increases. When the temperature of the reaction mixture is −10° C. the solution is filtered. The yield of 4,4′-dibromobiphenyl (92.2 g.) is 98% of theoretical. Analysis by g.l.p.c shows the product to contain only 1.8% of 2,4′-dibromobiphenyl.

EXAMPLE 2

The above example is repeated using 102 g. bromine with the exception that the temperature of the reaction is maintained at −20° C. by an external cooling bath at the initial stages of the reaction. The bath is later removed when the boiling hydrobromic acid is able to maintain this low temperature. The combined analysis which includes the filtered product and the residue recovered from the evaporation of the filtrate is as follows:

| | Percent |
|---|---|
| Biphenyl | 1.2 |
| Monobromobiphenyl | 4.5 |
| 2,4′-dibromobiphenyl | 0.5 |
| 4,4′-dibromobiphenyl | 94.8 |

EXAMPLE 3

Example 1 is repeated using 51.0 g. diphenyl ether and 102 g. bromine. The yield of 4,4′-dibromodiphenyl ether (88.7 g.) is 90% of the theoretical. G.l.p.c. analysis of the crude product indicates that it contains greater than 99% of 4(4′-dibromodiphenyl ether. The product is isolated by distillation of the sulfur dioxide.

What is claimed is:

1. A process comprising reacting one mole of a compound selected from the group consisting of biphenyl and diphenyl ether with two moles of bromine in the presence of liquid sulfur dioxide at a temperature within the range of from −40° to −5° C.

2. The process of claim 1 wherein bromine is reacted with biphenyl in a molar relationship of about 2.1:1.

3. The process of claim 1 wherein bromine is reacted with diphenyl ether in a molar relationship of about 2.1:1.

4. The process of claim 1 wherein the product is recovered from the reaction mixture by filtration.

5. The process of claim 4 when conducted at a temperature of from −30° C. to −10° C.

References Cited

UNITED STATES PATENTS

| 2,046,090 | 6/1936 | Reed | 260—649 |
| 3,232,959 | 2/1966 | Hahn. | |

BERNARD HELFIN, Primary Examiner

U.S. Cl. X.R.

260—649

Dedication 3,518,316.—*Charles Carmen Cumbo*, Wilmington, Del. BROMINATION PROCESS. Patent dated June 30, 1970. Dedication filed Nov. 12, 1970, by the assignee, *E. I. du Pont de Nemours and Company*.

Hereby dedicates the remaining term of the patent to the Public.

[*Official Gazette January 12, 1971*]